Dec. 27, 1955   J. E. ESHBAUGH   2,728,227
MAGNETIC LIQUID LEVEL INDICATORS
Filed May 27, 1953

INVENTOR
Jesse E. Eshbaugh
BY
ATTORNEY

United States Patent Office 2,728,227
Patented Dec. 27, 1955

2,728,227

MAGNETIC LIQUID LEVEL INDICATORS

Jesse E. Eshbaugh, Flint, Mich., assignor to General Motors Corporation, Detroit, Mich., a corporation of Delaware Application May 27, 1953, Serial No. 357,745

4 Claims. (Cl. 73—319)

This invention relates to liquid level indicators for or in combination with liquid receptacles and more particularly to liquid level indicators which are operable by means of magnets.

An important object of this invention is to provide an indicator of simple inexpensive construction which is small and compact in size and which may easily be installed in relation to a receptacle.

One feature of the invention is a receptacle having a wall portion of non-magnetic material and two magnetic bodies arranged in a common magnetic field, one acting as a follower on one side of the wall portion and the other being located to roll on the other side of the wall portion and being buoyant in order to rise and fall with the level of liquid in the receptacle.

Another feature comprises two magnetic bodies which are mutually attracted, mounted for rolling movement, and which are located on opposite sides of a non-magnetic wall with one of the bodies being buoyant.

Still another feature is an arrangement of a magnetic follower on one side of a non-magnetic wall and a bar magnet loosely disposed within a float on the other side of said wall, the follower, magnet and float being cylindrical with their axes substantially parallel and the follower and float being in rolling contact with said wall.

These and other features of the invention will now be described in detail in the specification and pointed out in the appended claims.

As an illustration of an embodiment of the present invention, the upper tank 10 of an automobile radiator is depicted as the receptacle in which the indicator has been installed.

Figure 3:
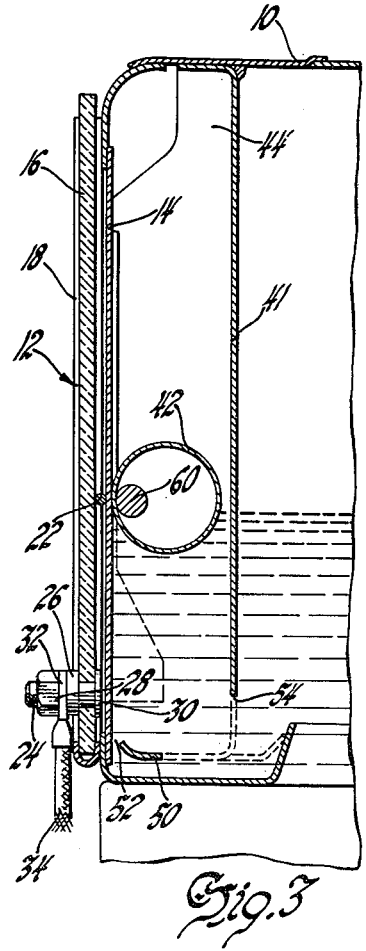
Figure 3 is a sectional view drawn to a still larger scale and taken along the line 3—3 of Figure 2.

The indicator is generally referred to in the drawings by the number 12. The tank or receptacle 10 is wholly fabricated from non-magnetic sheet material such as brass or copper in order to avoid corrosion. Spaced outwardly from the outer wall 14 of tank 10 is a transparent window member or shield 16 which is held in place by a U-shaped frame 18 soldered to the wall 14. The space between the wall 14 and the transparent shield 16 is of sufficient width to permit vertical motion of a soft iron follower 22. The follower 22 is in the form of a cylindrical bar to facilitate rolling contact thereof with the outer surface of the wall 14 as will further appear. A bolt 24 is provided near the lower portion of shield 16 and is held in place by a washer 26 and a nut 28, as shown in Figure 3. The head 30 of the bolt is of such thickness that a slight clearance exists between the inner end thereof and the wall 14. A terminal 32 is secured to bolt 24 between the washer 26 and the nut 28 and has one end of an electric conductor 34 connected thereto, the other end being connected to one terminal of a signal lamp 36. The other terminal of lamp 36 leads to a battery 40 which is connected to ground. It will be understood that the shield 16 is of non-conducting material, such as plastic or glass, through which the follower 22 may be visually observed. The bolt 24 is normally insulated from any electrical contact with the receptacle 10.

Figure 1:
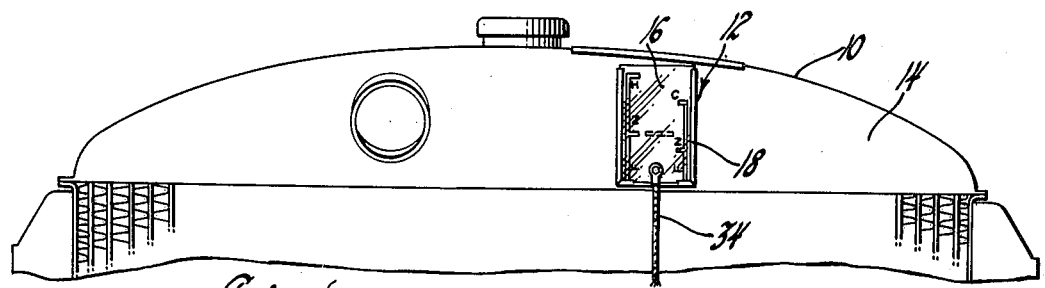
Figure 1 is an elevational view of the top portion of an automobile radiator.
Figure 2:
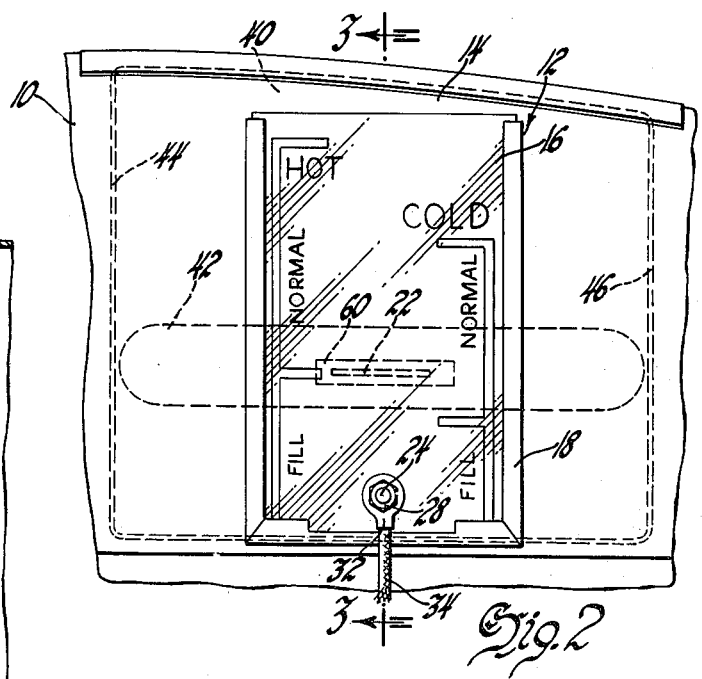
Figure 2 is in enlarged view of a portion of Figure 1.

If desired, the transparent shield 16 may have markings and legends thereon, as shown in Figure 2, to indicate different liquid levels in the receptacle 10.

A partition 41 is arranged vertically within the receptacle 10 and is spaced from the wall 14 to provide a guide space for a buoyant cylindrical tube or float 42 of non-magnetic material such as brass. The wall or partition 41 is made slightly wider than the length of the float 42 as seen in Figure 2 and two end walls 44 and 46 are provided which may be in the form of flanges on the partition 41. These flanges are to restrain the float 42 against endwise displacement from its position between the wall 14 and the partition 41.

Preferably the partition 41 is secured to the top wall of the receptacle 10 by welding to depend therefrom toward the bottom of the latter. The lower end of partition 41 is bent to provide a horizontal flange 50 which has openings 52 and 54 therein to permit circulation of the liquid in the space between said partition and the end wall 14.

Within the buoyant tube 42 is located a cylindrical bar magnet 60 which is considerably smaller in diameter than the float 42 and shorter in length as shown in Figure 2.

The operation of the indicator is quite clear from the above disclosure and it will be noted that a rise of the liquid level in the receptacle 10 will cause the float 42 to roll upwardly along the wall 14 and the magnet 60 to roll along in and with it. The follower 22, also being cylindrical and located within the shield of the magnet 60, will also roll along the wall 14 but on the outside thereof and its position will visually indicate the liquid level through the transparent shield 16.

The drawings show the preferred embodiment in that the magnet 60 is placed inside the float 42 with a soft iron follower 22 outside the tank 10 acting as an indicator. In this construction, undue displacement of the follower 22 is prevented by the shield 16 which guards against the possible effect of air currents or inadvertent brushing away of the follower by some foreign object.

Although the arrangement shown is preferred, as stated, it will also be appreciated that the positions of the magnet 60 and the iron follower 22 might be reversed without departing from the spirit of the present invention.

Another expedient which may be used in the practice of this invention is to use two magnets with oppositely charged ends so as strongly to attract each other.

Figure 4:
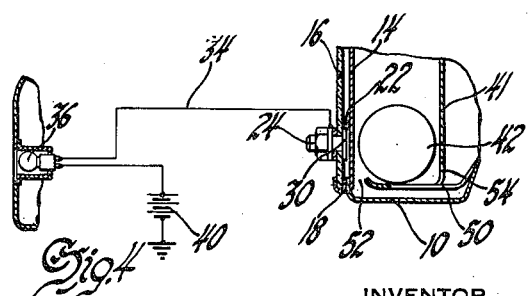
Figure 4 is a diagrammatic view of an alarm system involving an electrical circuit and a liquid receptacle, only a portion of the receptacle being illustrated.

With regard to the electrical alarm system or additional indicator of Figure 4, a low water level will cause the float 42 to assume a low position and the follower 22 will therefore lodge between the wall 14 and the top edge of the bolt head 30. An electrical circuit will thereby be closed with the result that the signal lamp 36 will be illuminated and will indicate that the water supply within the receptacle 10 should be replenished.

I claim:

1. A liquid receptacle having a wall portion of non-magnetic material including a bar magnet arranged within a cylindrical buoyant tube to act as a unit for rolling action on the inside of said wall portion, a cylindrical magnetic follower arranged on the outside of said wall portion within the field of said magnet, and means for protecting said follower against undue displacement.

2. A liquid level indicator including a wall portion of non-magnetic material, a cylindrical bar magnet, a buoyant cylindrical tube of non-magnetic material loosely confining said cylindrical bar magnet and located at one side of said wall portion, a cylindrical magnetic follower at the other side of said wall portion within the field of the said magnet and the axes of said magnet, tube and follower being substantially parallel.

3. A liquid level indicator including a wall portion of non-magnetic material, two mutually attracted magnetic cylindrical bodies arranged in a mutual field of magnetic attraction, one of said bodies being on one side of said wall portion, a buoyant closed cylinder of non-magnetic material, the other of said bodies being within and free to roll within said closed cylinder, said closed cylinder being disposed on the other side of said wall portion, and the axes of said bodies and cylinder being substantially parallel.

4. A receptacle having a liquid level indicator comprising a wall portion of non-magnetic material forming a part of said receptacle, a magnetic cylindrical follower disposed on the exterior side of said wall portion, a buoyant closed cylinder of non-magnetic material disposed adjacent the interior side of said wall portion and supported on the liquid in said receptacle, a cylindrical magnet loose within said closed cylinder, said follower being located within the field of said magnet, the axes of said closed cylinder, magnet and follower being substantially parallel, and a transparent shield mounted in spaced relation with said wall portion to enclose said follower and protect it against undue displacement.

References Cited in the file of this patent

UNITED STATES PATENTS

| | | |
|---|---|---|
| 995,414 | Nault | June 13, 1911 |
| 2,233,572 | Atkins | Mar. 4, 1941 |

FOREIGN PATENTS

| | | |
|---|---|---|
| 269,782 | Great Britain | Apr. 28, 1927 |
| 654,129 | Great Britain | June 6, 1951 |